United States Patent [19]

Barzilai et al.

[11] 4,150,878

[45] Apr. 24, 1979

[54] HOLLOW-SPACE CELL AND METHOD FOR ITS MANUFACTURE

[76] Inventors: Giorgio Barzilai, via Eudossiana 18, Rome; Paolo Maltese, via Donolo 29, 00153 Rome; Cesare M. Ottavi, viole Soroalio 214, Rome, all of Italy

[21] Appl. No.: 871,756

[22] Filed: Jan. 23, 1978

Related U.S. Application Data

[63] Continuation-in-part of Ser. No. 748,376, Dec. 7, 1976, abandoned, which is a continuation of Ser. No. 565,049, Apr. 4, 1975, abandoned.

[30] Foreign Application Priority Data

Apr. 5, 1974 [IT] Italy .............................. 50199 A/74

[51] Int. Cl.² ........................................... G02F 1/13
[52] U.S. Cl. ................................... 350/344; 156/102; 156/163
[58] Field of Search ................... 350/344; 156/15, 99, 156/101, 102, 107, 163

[56] References Cited

U.S. PATENT DOCUMENTS

| 3,742,600 | 7/1973 | Lowell | 350/344 X |
|---|---|---|---|
| 3,771,855 | 11/1973 | Burns | 350/344 X |
| 3,886,014 | 5/1975 | Bayer | 350/344 X |
| 4,050,786 | 9/1977 | Feldman | 350/344 |

*Primary Examiner*—Edward S. Bauer
*Attorney, Agent, or Firm*—Diller, Ramik & Wight

[57] ABSTRACT

A method is disclosed for the manufacture of cells having a hollow space adapted to lodge a liquid crystal, such cells being used, for example, in various display devices. The essence of the method is to induce in the supporting members forming the walls of the cell an elastic deformation and to maintain the confronting cell surfaces pressed together with the interposition of appropriate spreaders. Such elastic deformation is originated by imparting an appropriate curvature to at least one of the supporting members prior to uniting them and welding them together. Critical values for the radius of curvature are given, as well as for the spreader interspaces.

15 Claims, 6 Drawing Figures

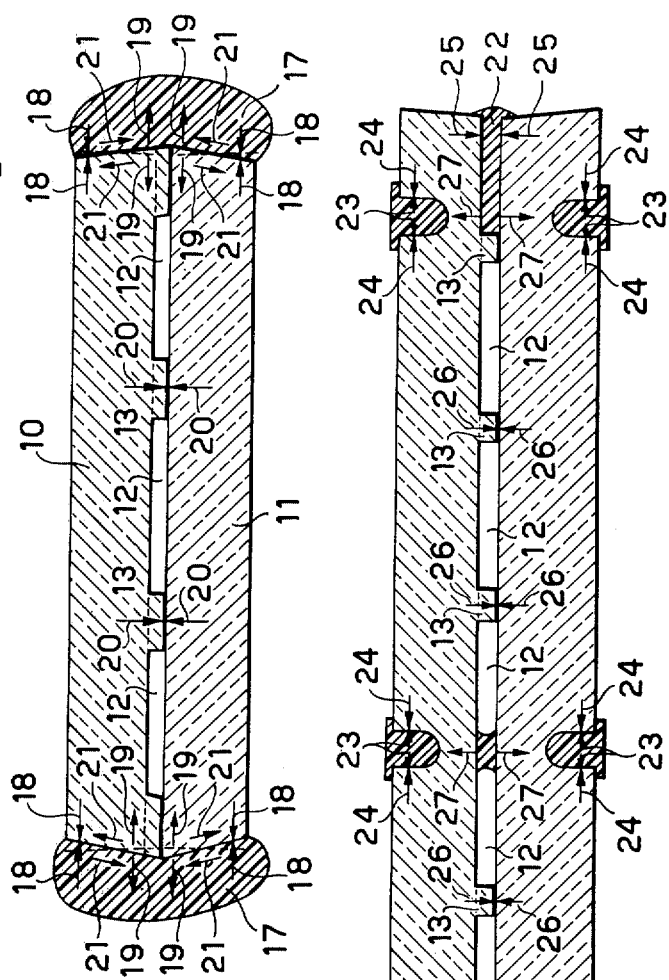

HOLLOW-SPACE CELL AND METHOD FOR ITS MANUFACTURE

This is a continuation-in-part of our U.S. patent application Ser. No. 748,376 filed on Dec. 7, 1976, and now abandoned which is in turn a rule 60 continuation of our U.S. patent application Ser. No. 565,049 filed on Apr. 4, 1975 now abandoned.

This invention relates to a hollow-space cell having improved tolerances and dimensional stability, and to methods for making same.

More detailedly, the invention relates to a cell having the characteristic feature that the thickness of the hollow space can be foreseen with great accuracy and remains virtually constant in spite of mechanical and thermal stresses the cell may be required to undergo.

It is intended herein with the term "cell" a unit formed by at least two supporting members, which are generally thin relative to their transversal dimensions, for example plates with at least two confronting surfaces, kept spaced apart from one another by appropriate means, and having therebetween a separatory space or hollow space. This unit, in its turn, can be a part of a more intricate structure, such as a multiple cell containing a plurality of superposedly arranged hollow spaces.

It is known that in the modern industry the cells have gained importance for a number of applications. More particularly, this is true of the electronic industry, wherein the liquid-crystal cells are promising as the solution of a number of problems connected with the display of images and data.

The liquid crystal cells, as it is well known, are cells in the hollow space of which a layer of a liquid crystal is contained, that is, a mesomorphic phase which, even though is in the liquid state, still retains a few properties of the solid crystals and, more particularly, anisotropy.

In the cells manufactured according to the conventional methods, the two supporting members in the form of planar slabs are welded together in the vicinity of the edges, with resins or other cementing materials which are adapted to lock them in the correct position and, often, hermetically to seal the hollow space. The correct gap between the surfaces is obtained by means of spreaders, made of a variety of materials and arranged along the welded edges or being an integral part of the welding seam.

Recent studies have shown the fact that, for a satisfactory operation of a cell in general, and of a liquid-crystal cell in particular, it is required that the thickness of the hollow space is kept, at every point, as constant as practicable in spite of the variations of the ambient conditions. In the specific case of the liquid-crystal cells in which, usually, a thin hollow space thickness is required, in the range from 1 to 50 microns, and wherein the supporting members are planar glass plates, it has been observed that, as the thickness is varied, undersirable changes can occur in operation, and/or even destructive phenomena, such as a gradual destruction of the alignment of the liquid-crystal molecules.

Now, in the cells made according to the conventional methods as outlined above, the supporting members become easily deformed when subjected to temperature differentials and/or mechanical stresses. In addition, in the case of liquid-crystal cells, it is necessary to have glasses with perfectly parallel surfaces in order than an even thickness may be obtained. By subjecting, for example, a cell having peripheral spreaders, to a force tending to compress the cell, and acting, for example, centrally in a direction perpendicular to the surfaces of the supporting members, the result is an unacceptable decrease of the thickness of the hollow space, as measured in the center.

In order that such a deformation may become small, it is required that the supporting plates have a high stiffness, that is, a thick wall thickness.

The situation has been improved in the past by using, rather than spreaders located on the edges only, spreaders scattered in the most even possible way in the hollow space. These spreaders, of course, must be enough small and spaced, so as to avoid any excessive diminution of the useful surface of the cell and any disturbance in the cell operation.

Such scattered spreaders can be made in a commercially acceptable manner in several ways. A method which is already known provides to spread on one of the surfaces granules of the appropriate size.

Another method provides to form such granules by removing, with appropriate methods, for example by chemical etching, a layer of material from one (or both, or still more) surface, having a shape and a thickness equal to the hollow space one desires to obtain, with the exception of a few areas which are masked with appropriate methods.

In such a case, inasmuch as the distance between the resting points is in the same order of magnitude as the thickness of the thinner plate, the compressive deformations are smaller than in the previous case and are essentially due to the crushing of the rough points and of the spreaders, whereas, as regards the traction forces, the behaviour of the structure remains unaltered over the previous case.

The behaviour as described above, however, would take place only in the ideal case in which the two confronting surfaces are exactly parallel to one another, for example both perfectly planar. In the actual practice, instead there will be extended areas where, by applying a compression force the spreaders will not contact the walls but after a certain decrease of the thickness of the hollow space in those areas, a decrease which is comparable with the planarity error of the surfaces.

The principal object of the present invention is to provide a cell, with a hollow space containing a liquid crystal in which the thickness of the hollow space is rigorously checked and permanently stable in the long run.

This object is substantially achieved according to the present invention by means of a hollow space cell of the kind comprising at least a couple of supporting members, between which a hollow space is formed, more particularly to lodge a liquid crystal, and a plurality of spreaders having thickness as that of the hollow space with a prearranged distribution between the confronting surfaces of the two supporting members, which is characterized in that the supporting members have starting surfaces which are not mating before the assembling and in absence of internal stresses and are, in the final cell, in a state of elastic deformation such as to impart to the surfaces of the supporting members a parallel condition in which they are in contact with each other.

In its turn, in the preferred embodiment, the method for the manufacture of a cell as hereinbefore defined, in which two supporting members are prearranged with a hollow space in which there are provided spreader members with a prearranged distribution whereafter the wo supporting members are united together and welded, is characterized in that there is imparted to at east one of the two starting supporting members, more particularly glass plates, a curvature preferably spherical and/or cylindrical, whereafter the two supporting members are pressed the one against the other until bringing into contact the two confronting surfaces via the spreaders and under such conditions the welding alongside the edges is carried out by means of a sealing cement or by means of whatever other means adapted to maintain the supporting members together.

In the previous definition there has been mentioned the curvature of at least one of the supporting members, before they are approached to one another. Now the cells according to the present invention are characterized also by the fact that, by virtue of the state of elastic deformation of at least one of the two supporting members, when the welding seam(s) alongside the edges are broken, the supporting members having initially a non planar shape takes again at least partially such as initial shape. In fact, in the practice of the cells according to the present invention and thus of the related manufacturing method, in one of the two starting supporting members, which normally consist of two plates of standard glass, a cavity of the desired depth for the hollow space with a number of spreaders, distributed inside the hollow space on a substantially regular grid having meshes of a width not greater than the thickness of the plates, is formed.

Then the curvature of one or both plates is effected, according to any method known in the field of the glass industry, such as for instance by subjecting the glass plates to a suitable thermal cycle according to which the plates are heated to a temperature of 350°-600° C. and then cooled.

The two plates, which can also have different curvatures, are approached and matched, so as to have the cavity forming the hollow space between the two plates.

In this condition the following possibilities exist:
(1) the matching surfaces are both convex;
(2) of the two matching surfaces, one is planar and the other concave or convex;
(3) of the two matching surfaces, one is concave and the other convex.

To form the cell it is then necessary to apply external forces to the two supporting members, so as to bring them in the condition of perfect planarity and coplanarity.

From the experimental results, which are confirmed by mechanical-mathematic considerations, it is demonstrated that the above condition is achieved only if the forces acting on the supporting members are consistent with the type of curvature of the supporting member(s). In fact, in the case of cylindrical surfaces, actions distributed along the two opposite edges of the outline, which are parallel to the generating lines of the cylindrical surface, are sufficient. In the case of spherical surfaces actions are needed in form of a pure torque or pair applied to the outline, whereas a distribution of forces acting onto all or almost all of the external surface of the supporting members is efficacious only is surfaces of the fourth order are involved.

In practice, if for instance the starting surfaces are spherical and due to the material impossibility of applying pure torques to the outline of the surfaces of the two supporting members, there is found that the coplanarity of the two opposing surfaces of the supporting members and thus the even thickness of the hollow space is obtained by applying distributed forces along the outlines of the supporting members and by taking into account that for a perimetral strip of the same supporting members the coplanarity condition cannot be obtained. The examination of the final cell and of the related interference fringes confirms in almost all cases the considerations above referred to. Once the plates have been deformed so as to obtain the constant thickness (within the aforesaid limits) of the hollow space, the edges of the plates are cemented and sealed by means of a suitable adhesive, the properties of which are obviously of the utmost importance: in fact the adhesive has the function of maintaining in a stable manner the deformation state of the plates, whereby the adhesive should not have a too high modulus of elasticity and moreover it must be stable with respect to external factors such as for instance the temperature.

In practice it has been found that adhesives based on epoxy reins, free from solvent, having a density of between 0.7 and 2 and having a dilatation coefficient of between 5 and $95 \cdot 10^{-6}/C.°$ are suitable.

Once the cell manufacturing is completed, the plates forming the supporting members are in the aforesaid state of elastic deformation, into a mutual contact via the spreaders, through which forces can be exchanged tending to maintain the two surfaces pressed against each other. The magnitude and the effective existence of the exchanged forces depend on the type of curvature of the starting plate and on the precision degree of the surface of the supporting members.

In addition to the method consisting in starting from two plates, at least one of which has a non planar shape, other methods can be adopted, such as the following:
(a) subjecting in the course of approaching and sealing the peripheral edges of the plates to a compressive stress acting upon the outermost layers of the plates and parallelly thereto, or
(b) forming on the outer surfaces of the two plates, in correspondence with the areas of mutual welding, grooves wherein additional material is forcibly introduced, whose presence and permanence generates the above mentioned state of elastic deformation.

The construction of the cell according to the present invention, in addition to affording better performances, permits to avoid rigorous specifications of the starting surfaces, making it possible to accept starting surfaces of a shape which is less strictly specified, as will as shown in the ensuing practical examples.

In addition, an outstanding aspect of the present invention is to permit to manufacture at low first cost a cell of the desired shape and the desired hollow space thickness are obtained with a high accuracy, even over a wide superficial extension.

The features and advantages of the present invention will become more clearly apparent from the ensuing description, in connection with the accompanying drawings, wherein:

FIGS. 5 and 6 show cross-sections of further embodiments of the cells according to the invention.

Figure 1:
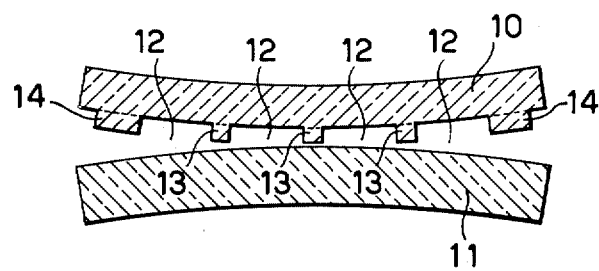
FIGS. 1 and 2 are diagrammatical showings of the two plate supporting members of the cell according to the present invention, before and after their pressing together and hermetic sealing, respectively.

Having now reference to FIG. 1, the numerals 10 and 11 indicate two supporting plates, usually of glass. In the plate 10, in correspondence with the surface which is intended to confront the other plate 11, there is formed a cavity 12, which provides in the cell the hollow space for lodging the liquid crystal and in which there are also provided spreaders 13, in addition to a peripheral ridge 14 extending all along the perimeter of the hollow space. Both the cavity 12 and the spreaders (which are evenly distributed) are made with the photoetching method, as known in other fields, but unusual for the cells, for removing with a chemical etchant a layer having the shape and the size which are desired with the tolerances which may be obtained with such a procedure.

As clearly seen in FIG. 1, the plates 10, 11 used as the starting members, are curved with a cylindrical curvature and are arranged with the convex faces confronting one another.

Figure 2:
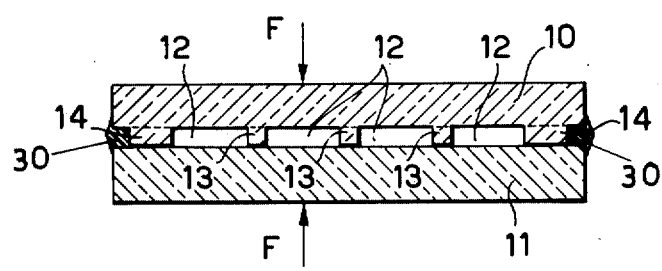

Once the processing operations on the individual plates have been completed, these are matched by approaching under an appropriate pressure the diverging edges until both the plates become planar and carrying out at this stage the peripheral welding 30, a cell such as shown in FIG. 2 being thus obtained.

In the structure of FIG. 2 the welding seam 30 on the inner corner of the edge of the plates 10, 11, which can be mechanically symbolized as a hinge, is subjected by the plates, which, if let free, would tend to take the convex shape as shown in FIG. 1, to tractive forces. In correspondence with the spreaders there are acting between a plate and the other compressive forces, whose resultant is equal and opposite to that of the aforesaid tractive forces.

In this connection, it is to be pointed out that, given one or two curved plates, only one distribution of external forces exists which is capable of generating the deformation of the plate (plates) needed for giving it (them) the planar shape. In the case of spherical surfaces, from the theoretical calculation it is desumed that such a distribution of external actions should consist of pure torques as applied to the edges of the plates. In view of the subtantial difficulty met in experimentally obtaining such a situation, the distribution of torques can be approximately realized as a load, uniformly distributed along the edges; the torque resulting from this loading and from the mutual reaction between the contact points of the two opposed surfaces gives place to a hollow space of constant thickness, apart from a perimetral zone of the plates.

Consequently it is only necessary to select the load so that the area of the hollow space zone fulfills the requisites of the cell.

Figure 3:
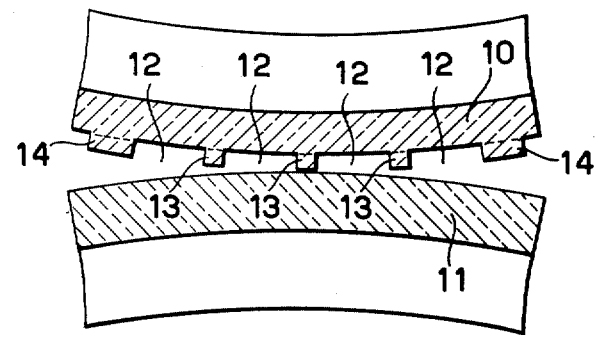
FIGS. 3 and 4 show cross-sections of several types of cells made according to the present invention.
Figure 4:
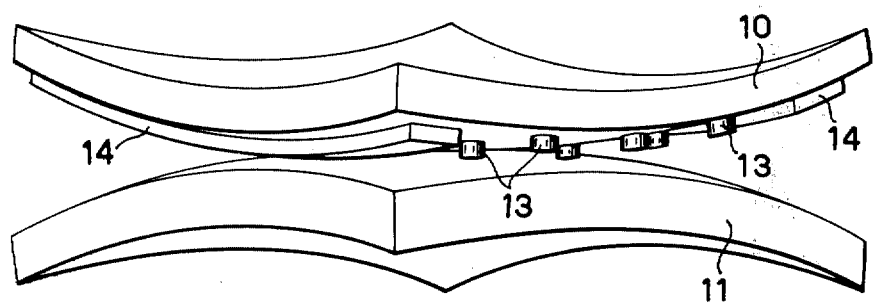

It is thus apparent that a characteristic feature of the cells according to the preferred embodiment of the FIGS. 1 and 2 is that, by breaking the seals, the two plates tend to resume the original curvature again. In FIGS. 3 and 4 there is shown a modification of the preferred embodiment in which the starting plates have a spherical curvature: as a matter of fact it is possible in such a way to impart to the starting plates the desired curvature radius while respecting the tolerance ranges which are of vital importance. As a matter of fact it has been found that to make the cells according to the present invention, it is preferred to start from planar glass plates which have the desired degree of planarity, that is, plates the roughness and surface ripples of which are contained within such a range as not to interfere in a subsequent time with the thickness of the hollow space. Thus, with the methods which are known in the field of the glass technology, there is imparted to this plate a spherical curvature with a radius of at least 5 meters, preferably with a radius comprised between 20 and 80 meters. After or prior to imparting the above mentioned curvature, one provides to form on the planar plates the spreaders in the desired number and arrangement, with the methods which are conventional in this field.

The plates with the confronting convex surfaces, are then pressed together and sealed along the edges such as illustrated in the foregoing.

In the structure of FIG. 5 the welding along the edges, as effected by means of the material 17, is mechanically comparable to a rigid restrained end and the median surface of the plates would not change its shape, if the plates would be left free. The surface of the edge, on the contrary, would tend to assume the shape as shown by the dashed line. This is because (contrarily to the preceding embodiments), the outer layers of the plates are subjected by the material 17 to a compression as represented by the force 18, whilst the internal layers undergo a tensile stress due to the forces 19.

The elastic reaction of the plates 10, 11, causes the presence of the compression forces 20 at the spreaders and of the counteracting forces 21, acting along the edges.

In the structure of FIG. 6 also, if the plates 10, 11 are left free, the median surfaces do not change their shape.

The plates are welded through the layers 22 and are provided with grooves filled with a material 23, such as to apply compression forces 24 onto the external layers of the plates.

As a consequence, the compression forces 26 at the spreaders and the balancing forces 25 and 27 are originated.

According to the method of preparation of the cells which is also a part of the present invention, one starts from supporting members having at least two surfaces to be placed in mutually confronting relationship, there are applied the appropriate spreaders and/or here are etched on one of the two (or on both or on more) surfaces the cavities of the desired depth, possibly variable if a variable thickness hollow space is desired, since these cavities (especially in the case in which they have a width which is great relative to the thickness of the thinner supporting member) can contain jutting teeth which act as spreaders.

Such a method is characterized in that, subsequently to what has been described above, the surfaces are matched by imparting thereto a pressure or a stretching force which is adapted to the shape of the starting surfaces so that the supporting members are deformed elastically and the surfaces may contact one another via the spreaders. The edges are then welded and/or other preselected positions are welded so that, by releasing the force system which had been applied, the surfaces remain in contact through the spreaders. Such welding seams also and preferably fulfill the requirement of hermetically sealing the hollow space.

The supporting members to be used must be constituted by materials, such as glass, having such mechanical properties as to be able to undergo stresses while retaining the internal stresses, under operative conditions and consistently with an adequate service life of the cell, without being additionally deformed, broken or remaining anyhow impaired during the service life.

The spreaders can be also of a number of materials: they must have such thickness, deformability and arrangement as to give rise to the formation of the expected hollow space. They can be obtained, for example, by scattering on at least one surface, glass beads of an uniform diameter. They can be also obtained, for example, and as outlined above, in the supporting member material itself, by masking a few areas in order not to remove material therefrom, the etching being carried out in the unmasked surface with an appropriate procedure. In any case, it has been found that for obtaining hollow spaces having thickness less than 5 micron, the distribution of the spreaders should be such that no point of the hollow space is spaced more than 4 mm from a spreader or from the perimeter of the hollow space.

Possibly, on the surfaces forming the cell walls, bores can be drilled for filling up the cell, channels may be grooved and so on.

The method and the cells as described in the present invention find a particular but not exclusive application in the electronic industry.

In order that what has been said hereinabove may be better understood, and without any implied limitation, there are described in the following a few examples of the performance of the method for the preparation of the cells as suggested by the present invention.

With reference to FIG. 2 a cell can be obtained according to the structure as diagrammatically shown in the Figure, as follows. The starting material is glass planar plates of a thickness of 3 mm and having the surfaces to be confrontingly mounted with ripples in the range of 1 micron and such as to give rise at any point and along any cross-sectional line of the surface to curvatures of less than 0.1 micron/sq. centimeter. The plates, measuring 10 by 10 cms, are subjected to such a heat treatment as to induce therein a curvature of 1 micron/sq. centimeter, almost uniform since it is much longer than the curvatures due to the initially present ripples.

On the convex surface of either plate and by photoetching procedures, the etching is carried out of a square cavity of 9 by 9 cms, 3 micron deep, with ridges starting from the bottom of the cavity and having a height equal to the cavity depth, of cylindrical configuration and with a diameter of 0.1 mms, placed on the apexes of a theoretical lattice of 1 by 1 millimeters as traced in the interior of the cavity.

There are then possibly deposited on the convex surfaces electrically and chemically active thin layers with methods which do not originate additional deformation in the glass so that the desired configurations are provided in the layers.

The two convex surfaces are then matched and, by impressing an even pressure of 1 kilogram/sq. centimeter, all the spreaders are brought into contact.

From the edges to the interior a small amount of epoxy resin is caused to seep and is allowed thoroughly to polymerize so as to prevent any subsequent displacements.

By releasing the pressure applied to the plates the inner surfaces are parallel within 0.2 microns, as confirmed by the figures of the interference fringes under sodium monochromatic light.

The same result can be obtained by applying a pressure of 2 kilograms per square centimeter before and after the cementing step, limitedly to a 5 mm wide strip alongside the entire periphery of the cell.

Another example for making the structure of FIG. 2 is as follows.

The same operations as described in the previous case are repeated, with the exception of the glass cambering, but for cementing, instead of the epoxy resin, a glass paste melting at about 550° C. is used.

During the thermal cycle which is required for welding the glass, the cell is subjected to a pressure over its entire surface and simultaneously to forces tending to shrink the outer layers of the plates. The forces tending to shrink the outer layers of the plates. The forces are obtained by applying to the outer cell surfaces two metal blocks which are surfaced, rigid and have an expansion coefficient higher than that of glass. The blocks are pressed against the plates at 570° C., allowed to cool down to 440° C., while still maintaining the cell under a pressure of 2 kilograms/sq. centimeter. This fact produces a plastic creep of the plate glass which gives rise, with cooling, to the same thickness evenness of the hollow space of the previously described embodiment.

The structure of FIG. 6 can be obtained as follows.

The starting supporting members are flat plates having the same thickness and surface properties as in the preceding examples.

To obtain a 53×73 cm plates of corresponding size are cut and one of them is provided with a 50×7 cm cavity, 3 micron deep, with ridges at the apexes of an ideal lattice of 5 mm, as in the preceding cases.

The thin possibly needed layers are deposited onto the plates, without inducing any deformation.

A 3 micron deep layer of epoxy resin is coated on one plate as a strip of 1.5 cms. width, both along the edges and so as to form a lattice having 10 cms long sides, over all the plate surface, except some interruptions of the stripes, aiming to communicate with each other the 10×10 cms. squares, in which the plate surface is thus divided.

The plates are matched and pressed together under 2 kgs/sq. inch pressure, whilst the resin is completely polymerized.

The thus obtained cell, upon the pressure is released, is not uniform since only few spreaders are into mutual contact.

U-shaped grooves are then cut in the outer surfaces of both plates, by means of a diamond wheel, at the welding zones, the grooves being 1.2 mm deep and 1 mm wide.

Within said grooves an aluminium wire is inserted, it being then pressed by means of a press. The residual compression of the aluminium is such as to originate the system of stresses as shown in FIG. 6 and a thickness uniformity of the hollow space within 0.1 micron all over the surface.

The structure of FIG. 2 can be preferably obtained starting from plates which have been curved according to a spherical curvature. The starting material is planar glass plates of the thickness of 3 millimeters and having a size of 68 by 35.5 millimeters. On the surface of one of the two plates there is formed by photoetching a centered hollow space of 58 by 20 millimeters, having a depth of 3 microns, and with ridges starting from the bottom of the hollow space and having a height equal to the hollow space depth, of a cylindrical shape and with a diameter of 0.05 millimeters, placed on the apexes of an ideal lattice of 2 by 2 millimeters as drawn in the inside of the hollow space. The thusly treated plates undergo such a heat treatment as to produce therein a spherical curvature corresponding to a radius of 51 meters.

There are then deposited on the convex surfaces, electrically and chemically active thin layers without deforming the glass and the desired configurations are then obtained on the layers.

The plates are matched by impressing an uniform pressure alongside the edges until bringing the spreaders into contact and the epoxy resin which is caused to seep from the edges towards the interior along a preselected distance is allowed to polymerize.

By releasing the pressure applied to the plates, the inner surfaces remain parallel within a tolerance of 0.1 to 0.6 microns, as confirmed by the figures of the interference fringes in monochromatic light (sodium yellow light).

What is claimed is:

1. A hollow-space cell of the kind comprising at least one couple of planar supporting members welded to one another alongside the edges, between which there is formed a hollow space, for lodging a liquid crystal, and a plurality of spreaders, having same thickness as that of the hollow space, with a preselected distribution between the confronting surfaces of the two supporting members, characterized in that the supporting members have starting surfaces which are not mating before the assembling and in absence of internal stresses and are, in the final cell, in a state of elastic deformation such as to impart to the surfaces of the supporting members a parallel condition in which they are in contact with each other via the spreaders and the peripheral frame of the hollow space.

2. A hollow-space cell according to claim 1, characterized in that, when the cell is opened by breaking the welding seam, the hollow space between the two supporting members takes the shape of a lens having a configuration selected among the biconcave, biconvex planoconcave and planoconvex shape.

3. A hollow-space cell according to claim 2, characterized in that, when the cell is opened by breaking the welding seam, the hollow space between the two supporting members takes the shape of a negative lens having greater thickness at the edges than at the center.

4. A hollow-space cell according to claim 1, characterized in that the thickness of the hollow space is not greater than 5 microns and every point of the hollow space is spaced not more than 4 mm from the nearest spreader or from the perimeter of the hollow space.

5. A hollow-space cell according to claim 1, characterized in that on the free surfaces of the two supporting members grooves are provided, corresponding to the welding zones, insert material being seated and forced into said grooves, whereby said stresses are generated.

6. A method for manufacturing hollow-space cells, in which two supporting members are prearranged with a hollow space, for lodging a liquid crystal, in which there are provided spreader members with a preselecgted arrangement, whereafter the two supporting members are mutually united and welded, characterized in that the two supporting members are united together so as to generate therein an elastic deformation such as to give them a planar shape with a mutual contact through the spreaders.

7. A method according to claim 6, characterized in that said elastic deformation is generated by imparting to at least one of the two supporting members, more particularly glass plates, a curvature and matching them so that the hollow space may take a shape selected amongst the biconcave, biconvex, planoconcave and planoconvex shapes, whereafter the two supporting members are compressed the one against the other until bringing into contact the confronting surfaces through the spreaders, and the supporting members as maintained under this condition are welded together alongside their edges.

8. A method according to claim 6, characterized in that both the supporting members are curved and are matched with the convex surfaces in confronting relationship.

9. A method according to claim 6, characterized in that, before the assembling, said supporting members have a spherical curvature with a radius of curvature of at least 5 meters, preferably comprised between 20 and 80 meters.

10. A method according to claim 6, characterized in that said spreader members are formed with a thickness not greater than 5 micron and are distributed so that no point of the hollow space is spaced more than 4 mm from a spreader or from the perimeter of the hollow space.

11. A method for manufacturing hollow-space cells according to claim 6, characterized in that two parallel supporting members are welded together at least at the edges, and grooves are formed in the free outer surfaces of both supporting members at the welding zones, insert material being wedged into said grooves.

12. A method for the manufacturing of hollow-space cells according to claim 6, characterized in that two planar supporting members are welded together along the edges, so that the frame formed by the welding material induces in the more external surface layers of the supporting members a compression parallel to the external surface of the same supporting members.

13. A method according to claim 6, characterized in that the hollow space and the spreaders are obtained by chemical etching, more particularly with the photo-etching methods for planar plates.

14. A hollow-space cell according to claim 1, characterized in that the edges of the cell are cemented and sealed with an adhesive based on epoxy resins having density of between 0.7 and 2 and dilation coefficient of between 5 and $95 \cdot 10^{-6}/°$ C.

15. A method for the manufacturing of hollow-spaced cells according to claim 6, characterized in that the edges of the cell are cemented and sealed with an adhesive based on epoxy resins, having density of between 0.7 and 2 and a dilation coefficient of between 5 and $95 \cdot 10^{-6}/°$ C.

* * * * *